(12) United States Patent
Gessenhardt et al.

(10) Patent No.: US 12,025,070 B2
(45) Date of Patent: Jul. 2, 2024

(54) METHOD FOR HEATING A CATALYTIC CONVERTER

(71) Applicant: Volkswagen Aktiengesellschaft, Wolfsburg (DE)

(72) Inventors: Christopher Gessenhardt, Weferlingen (DE); Karsten Michels, Magdeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/534,627

(22) Filed: Dec. 9, 2023

(65) Prior Publication Data

US 2024/0102427 A1    Mar. 28, 2024

Related U.S. Application Data

(63) Continuation of application No. PCT/EP2022/065504, filed on Jun. 8, 2022.

(30) Foreign Application Priority Data

Jun. 9, 2021    (DE) .................. 10 2021 114 777.8

(51) Int. Cl.
*F02D 41/02* (2006.01)
*F02B 19/12* (2006.01)
(Continued)

(52) U.S. Cl.
CPC .......... *F02D 41/0245* (2013.01); *F02B 19/12* (2013.01); *F02D 13/0249* (2013.01);
(Continued)

(58) Field of Classification Search
CPC .. F02D 41/024; F02D 41/008; F02D 41/0245; F02D 13/0249; F02B 19/12; F02P 5/1504
(Continued)

(56) References Cited

U.S. PATENT DOCUMENTS 4,499,872 A * 2/1985 Ward .................. F02B 23/08
123/638
5,398,502 A    3/1995 Watanabe
(Continued)

FOREIGN PATENT DOCUMENTS

DE    3506107 A1    8/1985
DE    69114490 T2    5/1996
(Continued)

*Primary Examiner* — Mahmoud Gimie
(74) *Attorney, Agent, or Firm* — Muncy, Geissler, Olds & Lowe, P.C.

(57) ABSTRACT

A method of heating a catalytic converter of an internal combustion engine, wherein the method comprises the steps of: igniting the gas charge in one of the cylinders in a range from 10° CA before ignition top dead center to 20° CA after ignition top dead center; and opening the exhaust valve of the cylinder exhaust of the cylinder in a range from 30° CA to 55° CA after ignition top dead center. The method allows the catalytic converter of the internal combustion engine to quickly reach operating temperature and thus contributes to the reduction of pollutant emissions. An internal combustion engine is also provided that is designed to carry out the method of the invention for heating a catalytic converter.

10 Claims, 3 Drawing Sheets

(51) Int. Cl.
  *F02D 13/02* (2006.01)
  *F02D 41/00* (2006.01)
  *F02P 5/15* (2006.01)
(52) U.S. Cl.
  CPC ......... *F02D 41/008* (2013.01); *F02D 41/024* (2013.01); *F02P 5/1504* (2013.01)
(58) Field of Classification Search
  USPC ....................................................... 701/102
  See application file for complete search history.

(56) References Cited

U.S. PATENT DOCUMENTS

| | | |
|---|---|---|
| 5,904,902 A | 5/1999 | Matuoka et al. |
| 8,000,875 B2 | 8/2011 | Klein et al. |
| 8,402,757 B2 | 3/2013 | Takeishi et al. |
| 9,528,402 B2 | 12/2016 | Cleeves et al. |
| 9,810,167 B2 | 11/2017 | Watanabe et al. |
| 2015/0337751 A1* | 11/2015 | Watanabe ........... F02D 41/0245 60/284 |

FOREIGN PATENT DOCUMENTS

| | | |
|---|---|---|
| DE | 10202437 A1 | 8/2003 |
| DE | 112014000459 T5 | 9/2015 |
| DE | 102017208857 A1 | 12/2018 |
| GB | 2267310 A | 12/1993 |
| WO | WO2015013696 A1 | 1/2015 |

* cited by examiner

METHOD FOR HEATING A CATALYTIC CONVERTER

This nonprovisional application is a continuation of International Application No. PCT/EP2022/065504, which was filed on Jun. 8, 2022, and which claims priority to German Patent Application No. 10 2021 114 777.8, which was filed in Germany on Jun. 9, 2021, and which are both herein incorporated by reference.

BACKGROUND OF THE INVENTION

Field of the Invention

The invention relates to a method for heating a catalytic converter of an internal combustion engine, and to a device for carrying out such a method.

Description of the Background Art

The current and increasingly stricter future exhaust gas legislation places high demands on the raw engine emissions and exhaust aftertreatment of internal combustion engines, especially 4-stroke gasoline engines.

Gasoline engines usually have what is known as a "three-way catalytic converter." This is a vehicle catalytic converter for exhaust aftertreatment, in which carbon monoxide (CO), nitrogen oxides ($NO_x$), and unburned hydrocarbons (HC) are converted to carbon dioxide ($CO_2$), nitrogen ($N_2$), and water ($H_2O$). The name catalytic converter is derived from the simultaneous conversion of these three air pollutants.

The measures known from the state of the art are not yet fully satisfactory. Thus, when the catalytic converter is heated while idling, especially when the vehicle is stationary, a reduction in the efficiency of the internal combustion engine has so far taken place due to the late shift of the ignition considerably after the top dead center (TDC) of the piston. The reduction in efficiency achievable hereby is limited by the maximum late ignition angle due to the smooth running of the engine, because the late shift in combustion is associated with poorer ignition and combustion boundary conditions. The known method is therefore not satisfactory because it is accompanied by a deterioration in ignition conditions due to the late ignition time, which makes the use of passive prechamber spark plugs more difficult. Thus, methods for heating catalysts have been described in U.S. Pat. Nos. 5,904,902 A, 9,810,167 B2, and 8,402,757 B2.

SUMMARY OF THE INVENTION

It is therefore an object of the invention to provide a method which enables more efficient exhaust aftertreatment in that carbon monoxide (CO), nitrogen oxides ($NO_x$), and unburned hydrocarbons (HC) are converted even more efficiently to carbon dioxide ($CO_2$), nitrogen ($N_2$), and water ($H_2O$), respectively.

According to an example of the invention, the object is achieved by a method for heating a catalytic converter of an internal combustion engine with at least one engine block, having a plurality of cylinders, and an exhaust tract, having a plurality of cylinder exhausts, wherein each of the plurality of cylinder exhausts can be opened and closed by an exhaust valve of the cylinder. In this case, a cylinder can also have more than one cylinder exhaust, for example, two. According to the method, ignition of the gas charge in one of the cylinders can take place in a range from 10° CA [crank angle] before ignition top dead center, ITDC, to 20° CA after ignition top dead center; and an exhaust opening of the exhaust valve of the cylinder exhaust of the cylinder takes place in a range from 30° CA to 55° CA after ignition top dead center, ITDC.

In the context of the present invention, the feature "exhaust opening of the exhaust valve of the cylinder exhaust of the cylinder" can refer to the beginning of the opening process, that is, the transition from a fully closed cylinder exhaust to an opened cylinder exhaust. In particular, the term refers to achieving a valve stroke displacement of 0.2 mm or more relative to the fully closed position.

The method allows the catalytic converter of the internal combustion engine to be quickly brought up to the operating temperature and thus contributes to a reduction in pollutant emissions. In particular, carbon monoxide (CO), nitrogen oxides ($NO_x$), and/or unburned hydrocarbons (HC) are converted to carbon dioxide ($CO_2$), nitrogen ($N_2$), and water ($H_2O$), respectively.

Improvement in the heating of the catalytic converter by significantly increasing the enthalpy of exhaust gases is achieved hereby, wherein both the exhaust gas mass flow and the exhaust gas temperature are increased. Unlike what was previously common when heating the catalytic converter when idling, in particular when the vehicle is stationary, wherein a reduction in the efficiency of the internal combustion engine occurs due to the late shift of the ignition significantly after the TDC of the piston, in the case of the method of the invention the effectively usable expansion phase between the ignition and exhaust opening is shortened. The method of the invention thus results overall in a significantly increased enthalpy of the exhaust gases and, at the same time, good ignition conditions at the time of ignition, which enables the use of passive prechamber spark plugs.

If numerical values are disclosed in the context of the present invention, a deviation of +/−10% from the respective value is included.

The method can be carried out at idle. Idling can be present when the vehicle is stationary. However, the method described here can also be carried out while the vehicle is in motion, especially in hybrid-powered vehicles, while the engine does not perform any work and the vehicle is electrically powered. The method is carried out according to claim 1, wherein the method is carried out when the vehicle is idling and/or stationary.

The internal combustion engine can be a 4-stroke gasoline engine.

A hook spark plug and/or a prechamber spark plug can be used for igniting the gas charge. The method of the invention results in a significantly increased enthalpy of the exhaust gases and, at the same time, good ignition conditions at the ignition time, which enables in particular the use of such passive prechamber spark plugs.

The method further comprises the step: exhaust closing the exhaust valve of the cylinder exhaust of the cylinder in a range from 300° CA to 390° CA after ignition top dead center.

This example is particularly preferred, because it enables the configuration, optimal for the operating point, of the exhaust opening and closing time. In particular, disadvantages can be prevented in that this example has a high residual gas rate in the combustion chamber due to the necessarily very early exhaust closure, which is accompanied by a reduced air flow rate and suboptimal ignition conditions in the combustion chamber.

The exhaust valve lift curve can be operated with a control width of 300° CA to 330° CA, preferably at 315° CA. Here, the discrete value 315° CA includes a deviation of +/−10%.

A valve lift curve switching mechanism can be preferably used. This allows the use of different valve lift curves for the conventional operation across the entire characteristic map and catalytic converter heating operation.

The method further comprises the step: exhaust closing the exhaust valve of the cylinder exhaust of the cylinder in a range from 230° CA to 290° CA after ignition top dead center.

In the context of the present invention, the "exhaust closing" feature of the exhaust valve of the cylinder exhaust of the cylinder refers to the end of the opening process, that is, the transition from an open cylinder exhaust to a fully closed cylinder exhaust. In particular, the term refers to achieving a valve lift deflection of 0.2 mm or less relative to the fully closed position.

As a further measure during catalytic converter heating, the ignition of the gas charge in a cylinder is shifted in the "late" direction ("late ignition") relative to an efficiency-optimized ignition time. In this context, the term "efficiency-optimized ignition time" may refer to an ignition time at which the internal combustion engine provides maximum torque. Preferably, the ignition time can be shifted in the "late" direction by at least 5° CA, in particular at least 10° CA, relative to the efficiency-optimized vignition time. Late ignition reduces the efficiency of combustion, so that less work is performed at the piston and more energy is available in the form of increased exhaust gas enthalpy for heating the catalytic converter.

Ignition of the gas charge in the cylinder occurs about 10° CA before to about 20° CA after ignition top dead center, in particular about 8° CA to before to about 16° CA after ignition top dead center. This allows particularly good ignition conditions at the ignition time, which enables the use of passive prechamber spark plugs.

The method is described, wherein the exhaust opening of the exhaust valve of the cylinder exhaust of the cylinder occurs at about 45° CA after ignition top dead center. Here, the discrete value of about 45° CA includes a deviation of +/−10%.

Insofar as method steps are listed in a specific sequence in connection with the invention described, this does not mean that these method steps must necessarily be carried out in this order. However, the indicated order of method steps is preferred. Further, each method step can also be repeated, if necessary, to achieve the object underlying the invention.

In connection with the present invention, the term "exhaust aftertreatment" as well as "exhaust aftertreatment device" is first used generally as a designation for a method or for a corresponding device for carrying it out, in which combustion gases, after they have left the combustion space or combustion chamber, are cleaned, i.e., freed from pollutants arising during combustion processes. This is done in particular by mechanical and/or catalytic devices.

In particular, the terms "exhaust aftertreatment" and "exhaust aftertreatment device" are used to designate a method or a corresponding device in which combustion products such as nitrogen oxides $NO_x$ are removed from combustion gases. The catalytic converter is the exhaust aftertreatment device or is part of this exhaust aftertreatment device if a particulate filter is also used.

A method is also described, wherein the combined exhaust gases are fed by means of a combined exhaust to the exhaust aftertreatment device comprising the catalytic converter.

The exhaust aftertreatment device can comprises a particulate filter, in particular a so-called gasoline particulate filter. The chemical reactions taking place in the exhaust aftertreatment device require a correspondingly high temperature level. This applies in particular to the regeneration of a particulate filter. However, the temperature level required for the efficient operation of the exhaust aftertreatment cannot always be achieved, depending on the driving profile. The measures of the invention are thus also suitable for the operation of particulate filters in exhaust aftertreatment. The gasoline particulate filter is a device for reducing the particulates present in the exhaust gas of gasoline engines, wherein two types of functions can be distinguished: wall-flow filters, in which the exhaust gas in the filter passes through a porous wall, or side-flow filters, in which the exhaust gas flows through the filter along its inner surface.

It is known to the skilled artisan that dead centers designate the positions of the crankshaft of an internal combustion engine in which the piston no longer performs any movement in the axial direction. The position of the dead centers is clearly determined by the geometry of the crankshaft, connecting rod, and piston. In four-stroke engines, an additional distinction is made between the gas exchange TDC (GETDC, between the exhaust and intake strokes) and the ignition top dead center (ITDC, between the compression and power strokes).

The dead center position of a crankshaft drive occurs when the three axes of rotation of the crankshaft axis and connecting rod bearing axis (drive rod, connecting rod) and piston pin axis and crosshead axis lie in one plane. A distinction is made between the top dead center (TDC), where the drive rod (piston, crosshead) has the greatest distance from the crankshaft, and the bottom dead center (BDC), where the drive rod has the smallest distance from the crankshaft. Because at these positions the drive rod force is absorbed completely, and without developing lateral components, by the axle bearings, the crankshaft drive cannot start up from either position without assistance.

The top dead center serves as a reference for the crankshaft position. The ignition time for gasoline engines and the start of injection for diesel engines are specified in degrees before TDC.

In a further aspect, the invention relates to an internal combustion engine comprising a catalytic converter and at least one engine block, having a plurality of cylinders, and an exhaust tract having a plurality of cylinder exhausts, wherein each of the plurality of cylinder exhausts can be opened and closed by an exhaust valve. According to the invention, the internal combustion engine is designed to carry out the method of the invention.

The various embodiments and examples of the invention mentioned in this application can be combined with one another, unless stated otherwise in the individual case.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
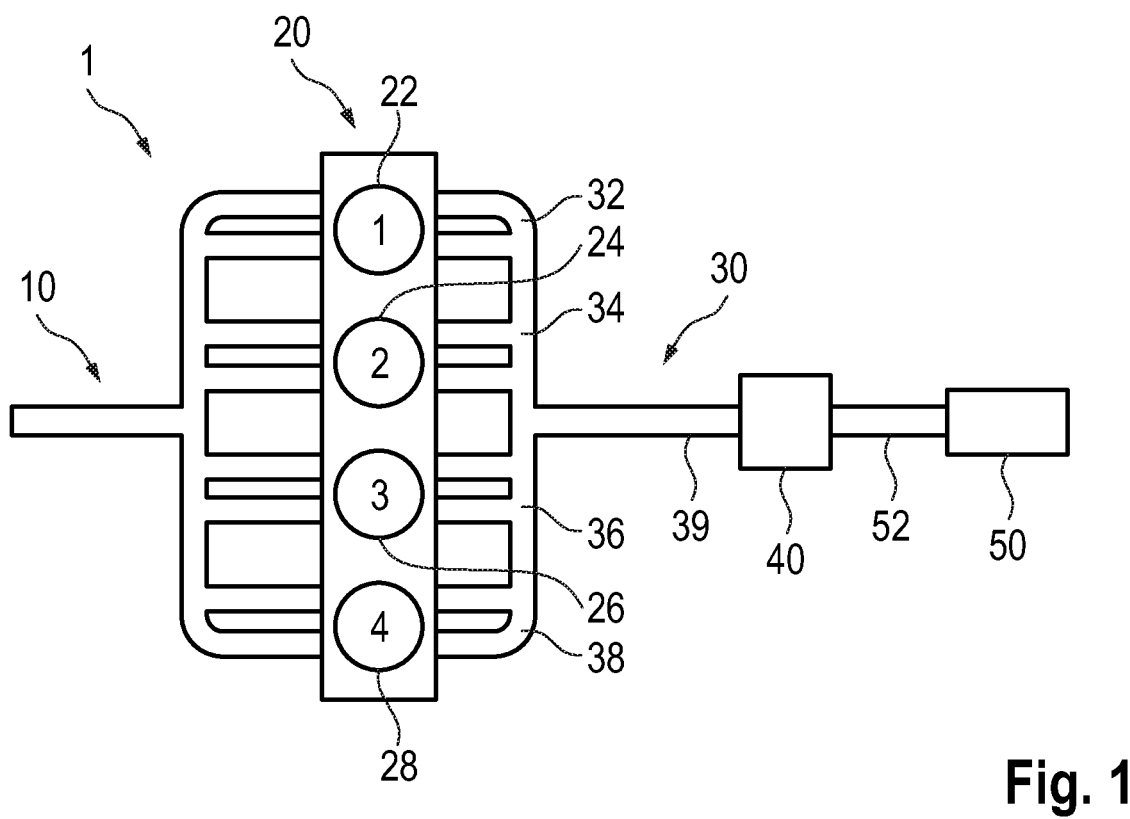
FIG. 1 shows an example of an internal combustion engine.

FIG. 1 schematically shows an example of an internal combustion engine 1. The engine comprises an engine block 20, which in the example shown comprises four cylinders 22, 24, 26, 28, and has an intake tract 10 with an intake manifold and an exhaust tract 30. The exhaust tract in turn has an exhaust manifold with a plurality of cylinder exhausts 32, 34, 36, 38. Each cylinder exhaust is connected to one of the four cylinders. The cylinder exhausts combine into a combined exhaust 39, first within the exhaust manifold and then within an exhaust duct. Exhaust gases arising during combustion in the cylinders are first passed downstream through cylinder exhausts 32, 34, 36, 38 and then combined in the combined exhaust 39.

An exhaust catalytic converter 40, to which the exhaust gases are fed via the combined exhaust, is arranged in the exhaust duct.

In gasoline engines, catalytic converter 40 is preferably a "three-way catalytic converter" that converts the three pollutants carbon monoxide CO, nitrogen oxides $NO_x$, and unburned hydrocarbons HC to carbon dioxide $CO_2$, nitrogen $N_2$, and water $H_2O$.

Catalytic converter 40 can optionally be connected to further exhaust treatment devices, for example, a gasoline soot particulate filter 50, by a supply line 52 through which the exhaust gases are passed on downstream.

Internal combustion engine 1, as shown schematically in FIG. 1, is suitable for carrying out the method of the invention, as will now be described in two examples in the further FIGS. 3 and 4.

Figure 2A:
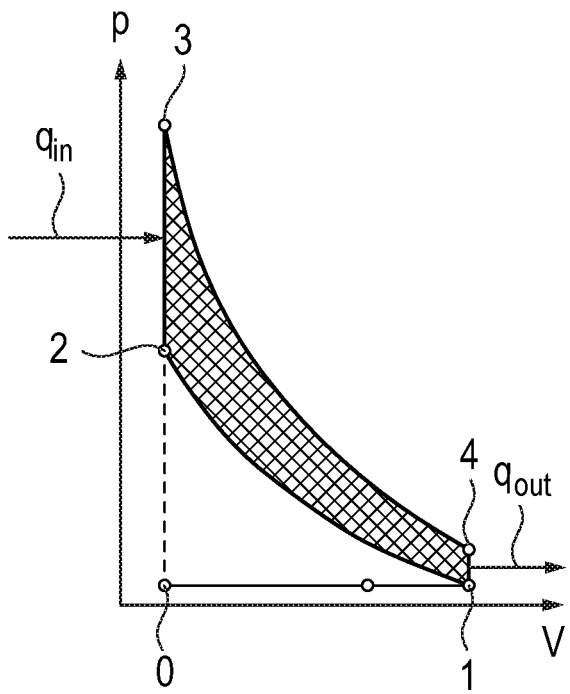
FIG. 2a shows an ideal Otto cycle.
Figure 2B:
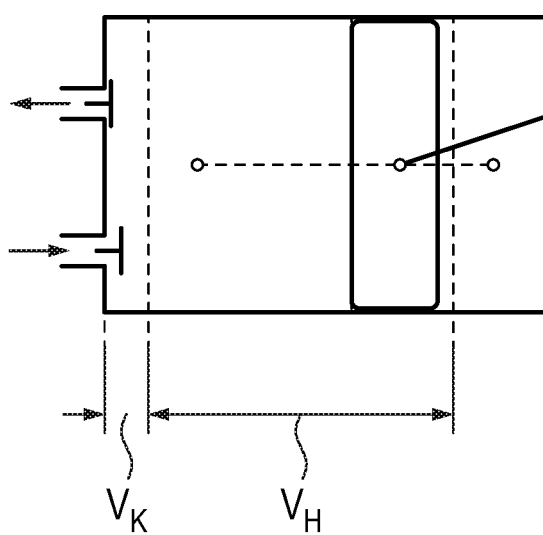
FIG. 2b shows a cylinder piston for such a cycle.

FIG. 2a schematically shows an ideal Otto cycle process, which provides a theoretical basis for the method of the invention. FIG. 2b schematically shows a cylinder with crankshaft drive for such a cycle, with the compression volume $V_K$ and the stroke volume $V_H$. In such an ideal process, no dissipation losses, mechanical friction losses, or the like are taken into account. Further, the working gas has the same properties over the entire cycle and flow losses are not taken into account. Further, no mixing of the charge mixture with exhaust gas is assumed.

Preferably, the invention relates to a method for a 4-stroke gasoline engine. A stroke includes a piston stroke or half a crankshaft revolution. In the case of the 4-stroke gasoline engine, the state changes can be assigned to the power strokes. This is described below with reference to FIG. 2a:

The first stroke, the intake stroke, comprises the intake, in which the piston moves to the right in FIG. 2b and the cylinder fills with fresh air. This corresponds to the connecting line between points 0 and 1 in the diagram.

The second stroke, the compression stroke, comprises the compression of the cylinder charge, wherein the piston moves to the left in FIG. 2b. In the diagram, this corresponds to the isentropic connecting line between points 1 and 2, and the isochoric heat input $q_{in}$ takes place by igniting and burning the gas charge, which corresponds to the connecting line between points 2 and 3 (constant volume combustion).

The third stroke, the expansion or power stroke, comprises the isentropic expansion, wherein the piston again moves to the right as a result of exothermic combustion. This corresponds to the connecting line between points 3 and 4 in the diagram.

The fourth stroke is also referred to as the exhaust stroke (heat dissipation), wherein the piston moves to the left again by opening the exhaust valve, the exhaust gases at bottom dead center expand outward without further work (connecting line between points 4 and 1), and the rest of the exhaust gas is pushed outward by the piston stroke (connecting line between points 1 and 0). In the process, the heat contained in the exhaust gas $q_{out}$ is released into the environment. The ideal process does not take into account that the residual amount in the compression chamber does not reach the ambient condition.

Figure 3:
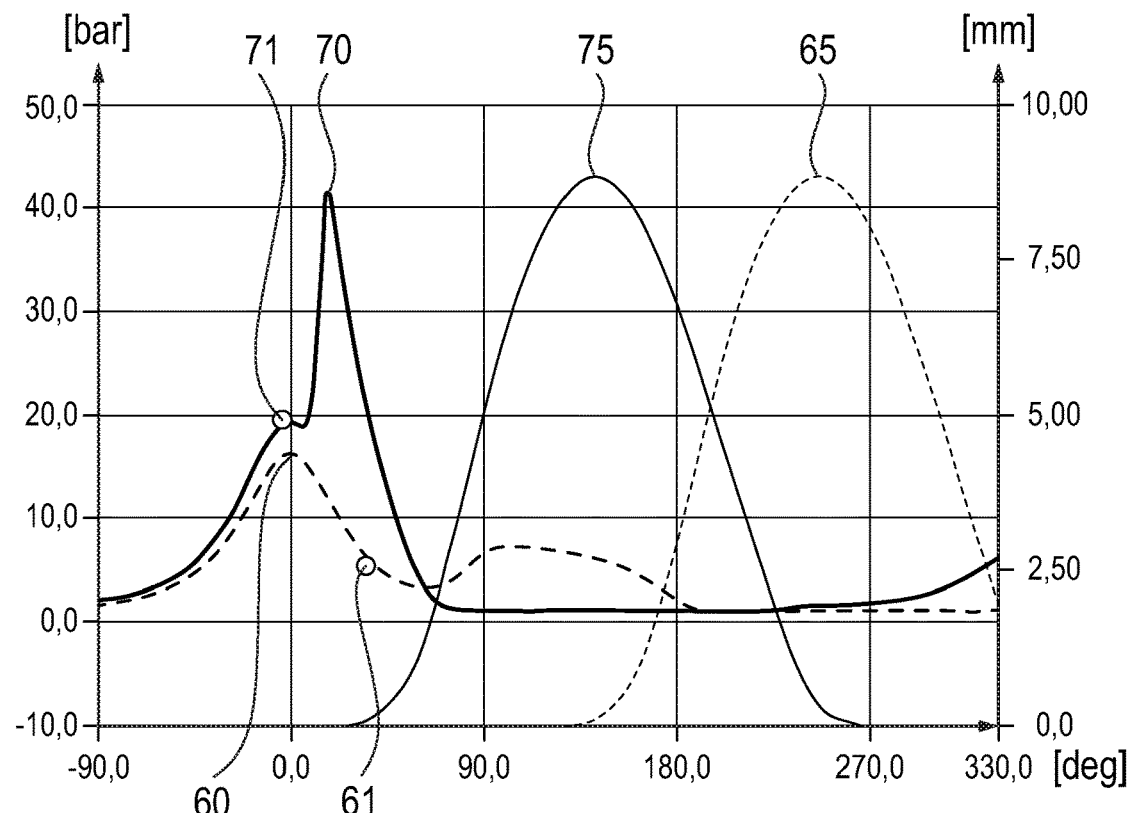
FIG. 3 shows a curve of cylinder pressure and exhaust valve lift according to an example.

FIG. 3 now shows the curve of cylinder pressure and exhaust valve lift according to an example of the invention and according to a conventional method for catalytic converter heating.

Reference number 60 here shows the curve of the cylinder pressure and reference number 65 shows the curve of the valve lift of the exhaust valve in the conventional catalytic converter heating mode from the prior art.

Further, reference number 70 shows the curve of the cylinder pressure during the catalytic converter heating operation of the invention, whereas reference number 75 describes the curve of the valve lift of the exhaust valve during the catalytic converter heating operation of the invention.

In the known method for heating a catalytic converter of a gasoline internal combustion engine, ignition 61 of the gas charge in one of the cylinders takes place relatively late after the ignition top dead center, whereas the exhaust opening of the exhaust valve of the cylinder exhaust of the cylinder also takes place late.

In the method of the invention for heating a catalytic converter of an internal combustion gasoline engine having at least one engine block, ignition 71 of the gas charge in the cylinders takes place early, for example, at the ignition top dead center, compared with the prior art, whereas the exhaust opening of the exhaust valve of the cylinder exhaust of the cylinder also takes place relatively early, for example, at about 45° CA after ignition top dead center.

The early exhaust opening can be represented here by an exhaust camshaft phaser with a very wide adjustment range, wherein a CA of at least 120° is assumed, as well as a cam contour that is also used outside the catalytic converter heating mode.

According to this example, the exhaust closure of the exhaust valve of the cylinder occurs in a range from 230° CA to 290° CA after ignition top dead center.

Figure 4:
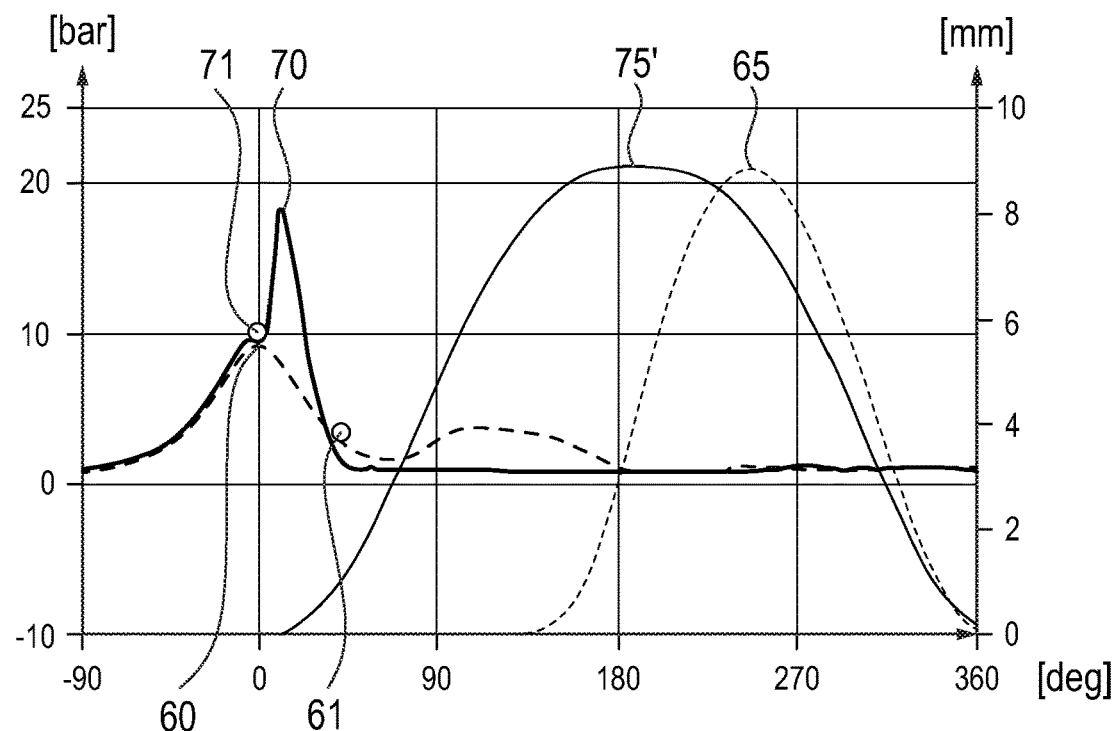
FIG. 4 shows a curve of cylinder pressure and exhaust valve lift according to an example.

FIG. 4 shows the curve of piston pressure and exhaust valve lift according to an example.

The curves and the reference numbers correspond to those in FIG. 3. However, exhaust closure 75' of the cylinder's exhaust valve takes place later, which results in a wider exhaust width. According to this example, the exhaust valve lift curve is operated with a control width of 300° to 330° CA, preferably at about 315° CA.

This example is particularly preferred, because it enables the configuration, optimal for the operating point, of the exhaust opening and closing time. Compared with the example according to FIG. 3, the associated disadvantages can be prevented in that this example has a high residual gas rate in the engine block due to the necessarily very early exhaust closure, which is accompanied by a reduced air flow rate and suboptimal ignition conditions in the combustion chamber.

The method of the invention results in a significantly increased exhaust gas enthalpy and, at the same time, good ignition conditions at the time of ignition, which enables the use of passive prechamber spark plugs.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for heating a catalytic converter of an internal combustion engine with at least one engine block having a plurality of cylinders and an exhaust tract having a plurality of cylinder exhausts, each of the plurality of cylinder exhausts being adapted to be opened and closed by an exhaust valve, the method comprising:
    igniting a gas charge in at least one of the cylinders in a range from 10° CA before ignition top dead center to 20° CA after ignition top dead center; and
    exhaust opening the exhaust valve of the cylinder exhaust of the cylinder in a range from 30° CA to 55° CA after ignition top dead center.

2. The method according to claim 1, wherein the method is performed at idle.

3. The method according to claim 1, wherein a hook spark plug and/or a prechamber spark plug are used for igniting the gas charge.

4. The method according to claim 1, further comprising exhaust closing the exhaust valve of the cylinder exhaust of the cylinder in a range from 300° CA to 390° CA after ignition top dead center.

5. The method according to claim 1, further comprising exhaust closing the exhaust valve of the cylinder exhaust of the cylinder in a range from 230° CA to 290° CA after ignition top dead center.

6. The method according to claim 1, wherein the ignition of the gas charge in one of the cylinders is shifted in the "late" direction relative to an efficiency-optimized ignition time.

7. The method according to claim 1, wherein the ignition of the gas charge in one of the cylinders occurs at the ignition top dead center.

8. The method according to claim 1, wherein the exhaust opening of the exhaust valve of the cylinder exhaust of the cylinder occurs at 45° CA after ignition top dead center.

9. The method according to claim 1, wherein the internal combustion engine is a gasoline engine.

10. An internal combustion engine comprising:
    a catalytic converter; and
    at least one engine block having a plurality of cylinders and an exhaust tract having a plurality of cylinder exhausts, each of the plurality of cylinder exhausts adapted to be opened and closed by an exhaust valve,
    the internal combustion engine being adapted to perform the method according to claim 1.

* * * * *